United States Patent
Haertling

(10) Patent No.: US 6,963,441 B2
(45) Date of Patent: Nov. 8, 2005

(54) DEACTIVATED ELECTRO-OPTIC MATERIAL AND METHOD OF FORMING THE SAME

(75) Inventor: Gene H. Haertling, Albuquerque, NM (US)

(73) Assignee: Teloptics, Corporation, Sunnyvale, CA (US)

( * ) Notice: Subject to any disclaimer, the term of this patent is extended or adjusted under 35 U.S.C. 154(b) by 607 days.

(21) Appl. No.: 09/891,689

(22) Filed: Jun. 26, 2001

(65) Prior Publication Data

US 2002/0163706 A1 Nov. 7, 2002

Related U.S. Application Data

(60) Provisional application No. 60/288,757, filed on May 4, 2001.

(51) Int. Cl.⁷ .............................. G02F 1/29; G02F 1/03
(52) U.S. Cl. ...................... 359/315; 359/250; 359/251; 359/254; 359/318; 359/323
(58) Field of Search ................................. 359/315, 245, 359/246, 250, 251, 254, 261, 318, 322, 323

(56) References Cited

U.S. PATENT DOCUMENTS

| | | | |
|---|---|---|---|
| 6,288,822 B2 | 9/2001 | Romanovsky | 359/245 |
| 6,297,899 B1 | 10/2001 | Romanovsky | 359/245 |
| 6,310,712 B1 * | 10/2001 | Romanovsky | 359/245 |
| 6,381,060 B1 * | 4/2002 | Romanovsky | 359/245 |
| 6,486,996 B1 | 11/2002 | Romanovsky | 359/245 |
| 6,614,574 B2 | 9/2003 | Romanovsky | 359/247 |
| 2002/0171904 A1 * | 11/2002 | Haertling | 359/245 |
| 2002/0181067 A1 | 12/2002 | Romanovsky | 359/245 |
| 2003/0063363 A1 * | 4/2003 | Romanovsky | 359/245 |

\* cited by examiner

*Primary Examiner*—Evelyn A. Lester
(74) *Attorney, Agent, or Firm*—Knobbe, Martens, Olson & Bear, LLP

(57) ABSTRACT

An electro-optically deactivated transmissive material comprises a plurality of chemicals which are sufficient, in combination, to enable formation of an electro-optic material having an index of refraction that is responsive to an electric field. The chemicals are combined with a glassifier so as to form a transmissive material that is less responsive to the electric field than said electro-optic material. The deactivated material has substantially the same refractive index as the electro-optic material in the absence of an electric field. In a preferred embodiment, the deactivated material is arranged with active material to form an optical switch.

17 Claims, 2 Drawing Sheets

DEACTIVATED ELECTRO-OPTIC MATERIAL AND METHOD OF FORMING THE SAME

PRIORITY APPLICATION

This application claims priority under 35 U.S.C. §119(e) from U.S. Provisional Patent Application Serial No. 60/288,757, filed May 4, 2001.

BACKGROUND OF THE INVENTION

1. Field of the Invention

The present invention relates generally to electro-optic materials and more particularly to optical switches utilizing electro-optic materials to provide switching by total internal reflection.

2. Description of the Related Art

Electro-optic materials are commonly used in optical devices that rely on refractive index changes to manipulate transmission of optical signals. For example, optical switches that operate on the principle of total internal reflection may utilize electro-optic material to selectively generate a refractive index interface in the presence of an electric field. When the electric field is present, the optical signal incident on the refractive index interface is reflected and when the field is turned off, the optical signal propagates without reflection.

The performance of such optical switches depends in large part on the index gradient across the refractive index interface. If the gradient is sharp and abrupt, the performance will be better than if the gradient is broad and fuzzy. Unfortunately, the tendency of electric fields to fringe makes it difficult to achieve an interface with an abrupt boundary. Proposed solutions have included permanently poling the electro-optic material in opposite directions on opposite sides of an interface. Application of an electric field on both sides of the interface affects the magnitudes of the poling differently so as to create a refractive index difference. Such devices, however, are complex and costly. Accordingly, there is a need for a simpler, less expensive solution.

SUMMARY OF THE INVENTION

In one aspect, the present invention provides an optical apparatus which in a preferred embodiment functions as an optical switch. The apparatus comprises a first portion, a second portion, and a pair of electrodes positioned to apply an electric field to at least the first portion. The first portion has electro-optic properties and is comprised of electro-optic material having an index of refraction which varies in response to application of the electric field. The electro-optic material is comprised of a plurality of chemicals which, in combination, are sufficient to impart the electro-optic properties. In one embodiment, the chemicals include lead, lanthanum, zirconium, and titanium which, in combination, are sufficient to enable formation of an electro-optically active PLZT material. Preferably, the chemicals comprise oxides of lead, lanthanum, zirconium and titanium. The second portion is comprised of the plurality of chemicals combined with a glassifier. The second portion has an index of refraction which is less responsive to an electric field than that of the first portion, and preferably substantially non-responsive. In one embodiment, the glassifier comprises silica, however other glass-forming chemicals such as boric oxide can also be used. Preferably, the refractive indices of the first and second portions are substantially the same in the absence of an electric field and the refractive index of the first portion is lowered when an electric field is applied to the first portion. In one embodiment, the first and second portions are joined together in a manner such that a boundary formed between the two portions is inclined at an angle fixed with respect to an incident light beam. Preferably, the incident light beam is totally internally reflected in response to application of an electric field and propagates through the boundary without substantial Fresnel reflection in the absence of an electric field.

In a second aspect, the present invention provides a composition of matter comprising a glassifier and a plurality of chemicals which are sufficient, in combination, to enable formation of an electro-optic material having an index of refraction that is responsive to an electrical field. The glassifier interacts with the chemicals in a manner so as to form a transmissive material that is less responsive to the electric field than the electro-optic material. Preferably, in the absence of an electric field, the transmissive material has substantially the same refractive index as the electro-optic material. However, if there is a difference in the refractive indices of the transmissive and electro-optic materials in the absence of an electric field, the angle of the boundary with respect to the incident light beam may be selected so that total internal reflection results only when an electric field is applied. In one embodiment, the chemicals comprise lead, lanthanum, zirconium, titanium and the glassifier comprises silica. In another embodiment, silica is approximately 0.6%–3.6% of the transmissive material by weight. In yet another embodiment, the silica is chemically bonded to the lead to form a lead glass.

In a third aspect, the present invention provides a transmissive material comprising a mixture of a plurality of materials comprising lead, lanthanum, zirconium, and titanium and a glass comprised of one of the lead, lanthanum, zirconium and titanium. Preferably, the plurality of materials comprises oxides of lead, lanthanum, zirconium and titanium. In one embodiment, the glass is comprised of a lead glass. In another embodiment, the glassifier comprises silica.

In a fourth aspect, the present invention provides a sol gel comprising a mixture of TEOS, a compound comprised of lead, a compound comprised of lanthanum, a compound comprised of zirconium, and a compound comprised of titanium. In one embodiment, TEOS comprises approximately 1%–2% by weight of the sol gel. In another embodiment, the atomic ratio of lanthanum to zirconium to titanium present in the sol gel is 1:55:45 respectively. In yet another embodiment, the lead compound comprises lead oxide, the lanthanum compound comprises lanthana, the zirconium compound comprises zirconia, and the titanium compound comprises titania.

In a fifth aspect, the present invention provides a method of manufacturing a transmissive material. The method comprises providing a sol gel that includes constituent components which are sufficient, in combination, to enable formation of an electro-optic material having one index of refraction in the absence of an electric field and another significantly different index upon exposure to an electric field, but which returns to the one index upon removal of the electric field. The method further comprises processing the sol gel to form a transmissive material having an index of refraction that is substantially insensitive to application of said electric field. In one embodiment, the processing comprises heating the sol gel to chemically react at least some of the components. In one embodiment, the method comprises providing a sol-gel comprised of silica, lead oxide, lanthana, zirconia, and titania, which are sufficient, in combination, to enable formation of a PLZT material. Furthermore, the method comprises sintering the sol-gel to chemically react the silica with the lead oxide to form a lead glass that suppresses the electro-optical properties of the transmissive material.

In a sixth aspect, the present invention provides a method of manufacturing a transmissive material. The method comprises providing a plurality of chemicals which, in combination, are sufficient to form a polycrystalline electro-optic material having electro-optic properties which cause a refractive index of the material to change in response to application of an electric field. The method further includes forming a structure comprising introducing a material to the chemicals which interferes with the orderly formation of the polycrystalline structure to suppress the electro-optic properties of the structure. In one embodiment, the method comprises providing a plurality of chemicals including lead oxide, lanthanum oxide, zirconium oxide, and titanium oxide which are sufficient, in combination, to form electro-optically PLZT. The method further comprises introducing a glassifier such as silica to the chemicals to form a deactivated PLZT having suppressed electro-optical properties.

In a seventh aspect, the present invention provides an optical switch comprising an electro-optic portion having electro-optic properties juxtaposed adjacent a non-electro-optic portion forming a boundary therebetween. The optical switch is formed by the method comprising introducing a plurality of chemicals which in combination are sufficient to impart electro-optical properties in a first region of said switch to form said electro-optic portion; introducing a plurality of chemicals into a second region adjacent said first region, said chemicals being sufficient to enable formation of an electro-optic material; combining a glassifier with said plurality of chemicals; and heating said chemicals and said glassifier to form a transmissive material in said second region having index of refraction substantially insensitive to an applied electric field.

DETAILED DESCRIPTION OF THE PREFERRED EMBODIMENT

Figure 1:
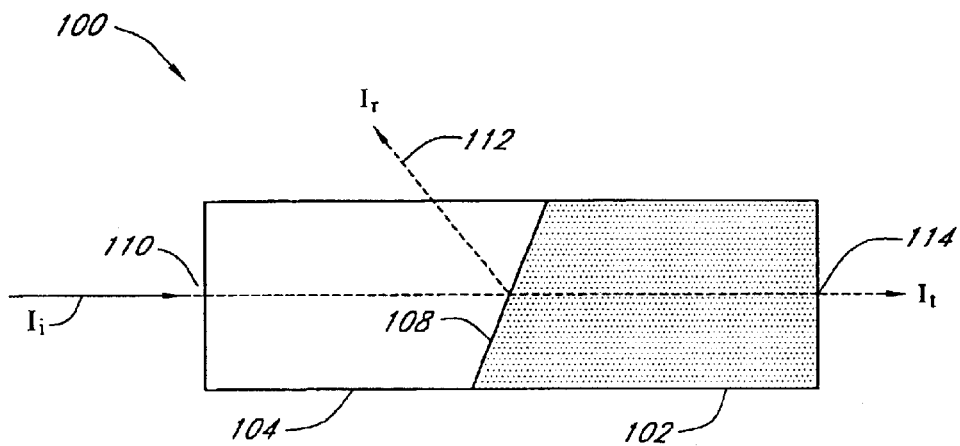
FIGS. 1 and 2 are schematic illustrations of an optical switch comprised of PLZT and deactivated PLZT.
Figure 2:
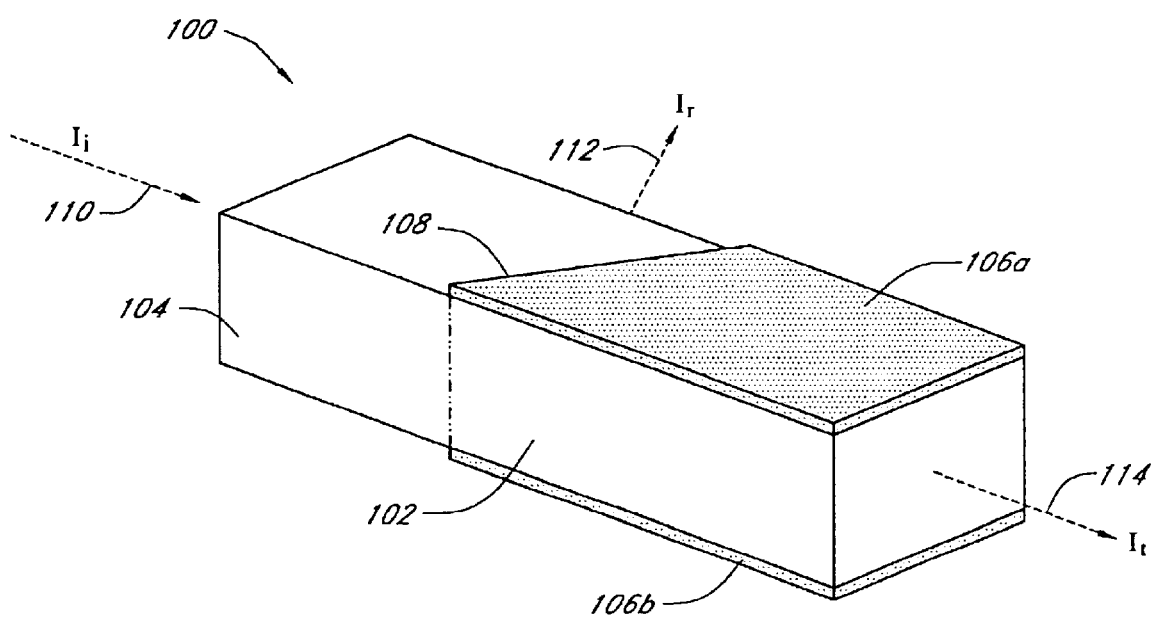

Reference will now be made to the drawings wherein like numerals refer to like parts throughout. FIGS. 1 and 2 schematically illustrate a preferred embodiment of an optical switch 100. As shown in FIGS. 1 and 2 the optical switch 100 generally comprises an electro-optically active portion 102, an electro-optically deactivated portion 104, and a pair of electrodes 106a, 106b disposed on opposite sides of the active portion 102. The active and deactivated portions 102, 104 of the optical switch 100 are joined together in a manner such that a boundary 108 formed between the two portions 102, 104 is inclined at an angle greater than a critical angle for total internal reflection with respect to an incident light beam $I_i$.

The active portion 102 comprises an electro-optic material having an index of refraction that varies in response to application of an electric field while the deactivated portion 104 comprises a deactivated electro-optic material having an index of refraction that is insensitive to electric fields. Preferably, the refractive index of the active portion 102 matches that of the deactivated portion 104 in the absence of an electric field so as to permit the incident light beam $I_i$ to propagate through the boundary 108 without substantial Fresnel reflection. However, when the switch 100 is exposed to an electric field, the refractive index of the active portion 102 is substantially lowered while the refractive index of the deactivated portion 104 remains substantially unchanged. As such, the resulting difference in refractive indices between the two portions 102, 104 creates a refractive index interface coincident with the boundary 108 that causes total internal reflection of the light beam $I_i$ incident on the boundary 108.

The refractive index interface is generated by applying a voltage between the electrodes 106a, 106b. As shown in FIG. 2, the electrodes 106a, 106b are identically shaped to cover only the active portion 102 and are disposed on opposite sides of the active portion 102 so as to generate an electric field that is parallel to the boundary 108. Although in the preferred embodiment the electrodes 106a, 106b are only on the active portion 102, in an alternative embodiment the electrodes could be on both the active portion 102 and the deactivated portion 104. In this case, the switch 100 will still operate in the manner as set forth above since the deactivated portion 104 is substantially insensitive to the electric field.

The optical switch 100 functions to switch an incident light signal $I_i$ between first and second outputs 112, 114. The application of the electric field lowers the refractive index of the active portion 102 relative to the deactivated portion 104 so that the incident light beam $I_i$ entering the deactivated portion 104 at an input 110 and striking the boundary 108 at an angle greater than the critical angle (approximately 45°) is total internally reflected and travels to the first output 112 where it is output as a reflected signal $I_r$. When it is desirable to switch the light signal to the second output 114, the electric field is removed so that the refractive index of the active portion 102 is restored to its original value, thus permitting the incident light beam $I_i$ to pass unreflected through the boundary 108 and reach the second output 114, where it is output as a transmitted signal $I_t$. Advantageously, the materials comprising the active and deactivated portions 102, 104 have substantially the same refractive index in the absence of the electric field so that the incident light beam $I_i$ can travel through the boundary 108 with reduced reflection and thus reach the second output 114 with reduced signal loss. Further, because the material 104 is insensitive to electric fields, the refractive index interface formed at the boundary 108 between the materials will be sharp and precise with an abrupt refractive index gradient.

In a preferred embodiment, the active portion 102 of the switch 100 comprises an electro-optically active lead lanthanum zirconate titanate (PLZT) material. The deactivated portion 104 comprises a PLZT material in which the electro-optic response has been deactivated by further processing. Since both portions 102, 104 are formed from PLZT, both portions 102, 104 have substantially similar refractive indices. The materials differ principally in that one is responsive to application of an electric field, while the other is not.

In one embodiment, the deactivated PLZT material comprises a glassifier and a plurality of chemicals which, in combination, are sufficient to enable formation of electro-optically active PLZT. Preferably, the glassifier is placed together with the chemicals to form a transmissive material having suppressed electro-optical properties. The preferred composition and method of forming such deactivated PLZT material are described below in greater detail.

As a background for describing the composition and method of forming the deactivated PLZT material, a brief description of the method of forming electro-optically active PLZT for optical switches is included hereinbelow. It is generally understood that PLZT is an optically transmissive ceramic material that can be applied to wafers and other substrate surfaces in the form of a coating. In particular, the PLZT can be formed on the substrate surface using a conventional sol-gel process. In a typical PLZT sol-gel process, precursor solution mixtures containing the necessary chemical components of PLZT are subject to a series of chemical and physical reactions to form a colloidal suspension generally known as a "sol". Thin films of the "sol" are subsequently coated onto the substrate surface by spin-coating or dip-coating. As solvents evaporate from the substrate surface, the particles suspended in the "sol" condense into solid macromolecules to form a wet "gel" on the substrate surface. With further drying and heat treatment, the macromolecules in the "gel" bond to form a dense film of PLZT material having a polycrystalline structure. However, it is preferable that instead of the use of a sol-gel process, as described above, a Metal Organic Decomposition process ("MOD") be used in which liquid acetate precursor solutions containing methanol are mixed together, the solution mixture is applied to the substrate surface and allowed to evaporate leaving a solid residue on the substrate, and the residue is subsequently heated to a sintering temperature of approximately 700 degrees Celsius, during which such heating causes the decomposition of the acetate precursors leaving metallic oxides which combine together to form a sintered solid mixture of the ceramic PLZT material.

Figure 3:
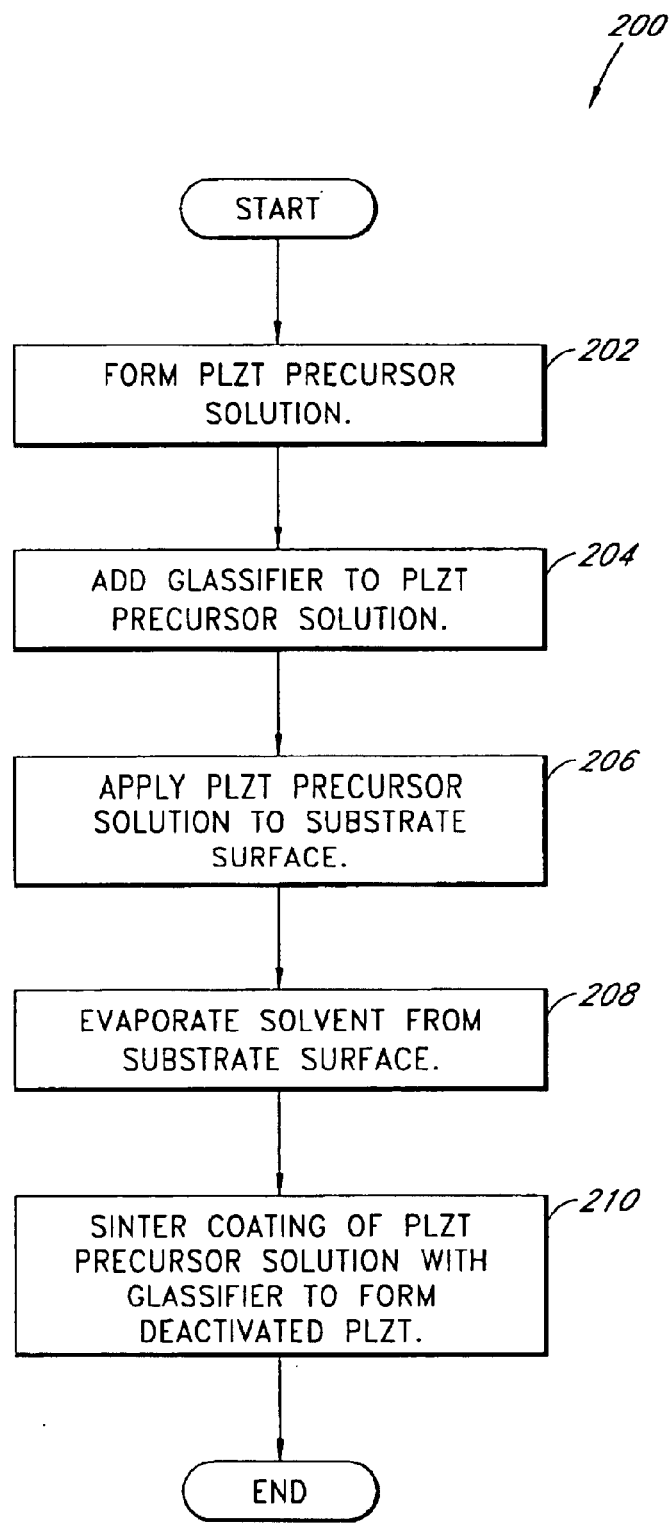
FIG. 3 is a schematic illustration of a method of forming deactivated PLZT.

The deactivated PLZT material can be formed by altering the above-described PLZT sol-gel process or the MOD process. FIG. 3 illustrates a preferred MOD method 200 of forming the deactivated PLZT material of the present invention. The method 200 begins with step 202 which comprises forming a PLZT precursor solution. In one embodiment, the PLZT precursor solution is prepared by mixing together methanol, titanium acetyl acetonate (TiAA), zirconium acetate, lead subacetate in acetic acid and methanol, and aqueous lanthanum nitrate. Upon mixing, the solution undergoes a series of generally known chemical and physical reactions to form a plurality of chemicals that are sufficient, in combination, to enable formation of a PLZT material. Preferably, the chemicals in the precursor solution include compounds of lead, lanthanum, zirconium, and titanium such as lead oxide (PbO), lanthana ($La_2O_3$), titania ($TiO_2$), and zirconia ($ZrO_2$).

In one embodiment, the ratio of the total number of atoms of lanthanum to zirconium to titanium in the precursor solution is 1:55:45 respectively. The 1/55/45 PLZT precursor solution can be formed by mixing together 45 grams of methanol, 15.3 grams of titanium acetyl acetonate (TiAA), 21.6 grams of zirconium acetate, 39.0 grams of lead subacetate in acetic acid and methanol, and 0.5 grams of aqueous lanthanum nitrate. In another embodiment, 2–3 grams of potassium acetate is also added to the PLZT precursor solution to promote grain growth in the PLZT. As it can be appreciated, the atomic ratio of the various components present in the PLZT precursor solution can vary depending on the particular formulation desired for the resulting material.

Subsequent to the formation of the PLZT precursor solution, a glassifier is added to the solution in step 204 whereby the glassifier is a chemical that interacts with at least one of the chemicals in the precursor solution to suppress the electro-optical properties of a transmissive material that is later formed from the glassifier and the chemicals. Preferably, the glassifier comprises silica ($SiO_2$), which is a silicon based compound. In one embodiment, $SiO_2$ is introduced into the PLZT precursor solution by adding a predetermined amount of tri-ethyl oxy-silane (TEOS) to the solution. Preferably, approximately 1%–2% of TEOS by weight is added to the precursor solution so as to provide an amount of $SiO_2$ that is sufficient to suppress the electro-optical properties of the transmissive material without creating other adverse effects. Preferably, the weight percent of $SiO_2$ relative to the total weight of $SiO_2$, $La_2O_3$, PbO, $TiO_2$, and $ZrO_2$ present in the PLZT precursor solution is between 0.6%–3.6%, more preferably about 1.9%. When the weight percent of $SiO_2$ is significantly greater than 3.6, degradation in opacity of the transmissive material or increase in electrical conductivity may result.

As FIG. 3 further shows, the PLZT precursor solution containing the $SiO_2$ glassifier is subsequently applied to a substrate surface in step 206. The substrate surface can be any number of different materials including sapphire, glass, or other base structures used for optical switches. Preferably, the substrate is repeatedly dip coated in the PLZT precursor solution to form thin layers of colloidal suspensions of the chemicals and glassifier on the substrate surface. In one embodiment, the coating is applied to regions on the substrate that comprise the deactivated portion 104 of the switch 100 shown in FIG. 1. In another embodiment, the deactivated portion 104 comprises a preformed cavity on a sapphire wafer and the cavity is filled with the coating using a conventional dip coating process. Following dip coating the substrate with the solution, the solvent in the coating is evaporated from the substrate surface in step 208. During solvent evaporation, the chemicals and glassifier are preferably left as a residue which may be sintered in a MOD process, or may be condensed into macromolecules to form a coating of "wet gel" on the substrate surface.

As FIG. 3 further illustrates, the coating on the substrate surface is subsequently subjected to high temperature treatment in step 210 in which the chemicals and glassifier are sintered to fuse them into a solid structure. As described above, the chemicals preferably comprise compounds containing lead, lanthanum, zirconium, and titanium which are sufficient, in combination, to form an electro-optically PLZT material. In one embodiment, the coating is sintered at approximately 700 degrees C. at which temperature the remaining solvents evaporate and the chemicals and glassifier in the coating combine to form a transmissive material having deactivated electro-optical properties.

In the preferred embodiment, the transmissive material comprises a deactivated PLZT material in which the glassifier is chemically bonded to at least one of the compounds containing lead, lanthanum, zirconium, and titanium. In one embodiment, the atomic ratio of lanthanum to zirconium to titanium in the transmissive material is approximately 9/65/35. In that embodiment, the atomic ratio of lead to the other listed metal constituents is 91. In another embodiment, the deactivated PLZT material is formed when $SiO_2$ fuses with lead oxide during sintering to form a lead glass which interferes with the orderly formation of the polycrystalline PLZT. Advantageously, the deactivated PLZT material still maintains substantially the same index of refraction as electro-optically active PLZT because the glass does not significantly alter the refractive index of PLZT in the absence of electric fields. Furthermore, other glassifiers such as boric oxide ($B_2O_3$) can also be added to the PLZT structure in place of $SiO_2$ to suppress the electro-optical properties of PLZT. In general, any chemical that is capable of forming glass in a PLZT structure can be used to deactivate the electro-optical properties of the PLZT. The glass interferes with the orderly formation of the polycrystalline structure of PLZT but does not significantly degrade its light transmissive properties. As such, the glass embedded in the PLZT structure is capable of deactivating the electro-optical properties of PLZT without significantly increasing its opacity or altering the index of refraction to an extent not compatible with angles usable between the incident light beam and the total internal reflection boundary. Thus, the deactivated PLZT material has a refractive index that is substantially the same as that of electro-optically active PLZT in the absence of an electric field, thereby allowing light signals to travel through boundaries between the deactivated and active PLZT portions in an optical switch with minimum reflection and signal loss. Furthermore, the deactivated PLZT material can be manufactured using a sol-gel process that is relatively inexpensive and easy to perform using conventional processing technologies and readily available raw materials. As such, the deactivated PLZT material of the preferred embodiment provides a cost-effective and efficient solution in improving the performance of optical switches.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by the appended claims.

What is claimed is:

1. A composition of matter, comprising:
   a glassifier; and
   a plurality of chemicals which are sufficient, in combination, to enable formation of an electro-optic material having an index of refraction that is responsive to an electric field, said glassifier combining with said chemicals so as to form transmissive material, one of the chemicals being chemically bonded to said glassifier such that said transmissive material is less responsive to said electric field than said electro-optic material.

2. The composition of claim 1 wherein said chemicals comprise lead, lanthanum, zirconium, and titanium which, in combination, are sufficient to enable formation of an electrically activated PLZT material.

3. The composition of claim 2 wherein said lead is chemically bonded to said glassifier to form a lead glass.

4. The composition of claim 1 wherein said glassifier comprises silica (SiO$_2$).

5. The composition of claim 4 wherein said silica comprises approximately 0.6%–3.6% by weight of the transmissive material.

6. The composition of claim 1 wherein said transmissive material has substantially the same refractive index as said electro-optic material in the absence of an electric field.

7. An optical apparatus comprising:
   a first portion having electro-optic properties, said first portion comprised of electro-optic material having an index of refraction which varies in response to application of an electric field, said electro-optic material comprised of a plurality of chemicals which, in combination, are sufficient to impart said electro-optic properties;
   a second portion comprised of said plurality of chemicals and a glassifier, said second portion having an index of refraction which is less responsive to an electric field than that of said first portion; and
   a pair of electrodes positioned to apply said electric field to at least said first portion.

8. The optical apparatus of claim 7 wherein said chemicals comprise oxides of lead, lanthanum, zirconium, and titanium which, in combination, are sufficient to enable formation of an electro-optically active PLZT material.

9. The optical apparatus of claim 8 wherein said glassifier in said second portion comprises silica.

10. The optical apparatus of claim 8 wherein said glassifier in said second portion comprises boric oxide.

11. The optical apparatus of claim 9 wherein said silica comprises approximately 0.6%–3.6% by weight relative to the combined weight of said silica and said chemicals in said second portion.

12. The optical apparatus of claim 9 wherein said silica combine with said chemicals in said second portion to form a deactivated PLZT material.

13. The optical apparatus of claim 7 wherein said first and second portions have substantially the same refractive index in the absence of an electric field.

14. The optical apparatus of claim 13 wherein said refractive index of said first portion is lowered when an electric field is applied to said first portion.

15. The optical apparatus of claim 14 wherein said first and second portions are joined together in a manner such that a boundary formed between the two portions is inclined at an approximately 45 degree angle with respect to an incident light beam.

16. The optical apparatus of claim 15 wherein said incident light beam is totally internally reflected in response to application of an electric field, and wherein said incident light beam propagates through said boundary without substantial Fresnel reflection in the absence of an electric field.

17. An optical switch comprising an electro-optic portion having electro-optic properties juxtaposed adjacent a non-electro-optic portion forming a boundary therebetween, said optical switch formed by the method comprising:
   introducing a plurality of chemicals which in combination are sufficient to impart electro-optical properties in a first region of said switch to form said electro-optic portion;
   introducing a plurality of chemicals into a second region adjacent said first region, said chemicals being sufficient to enable formation of an electro-optic material;
   combining a glassifier with said plurality of chemicals; and
   heating said chemicals and said glassifier to form a transmissive material in said second region having index of refraction substantially insensitive to an applied electric field.

* * * * *